US012668192B2

(12) United States Patent
Galin et al.

(10) Patent No.: US 12,668,192 B2
(45) Date of Patent: Jun. 30, 2026

(54) VEHICLE UNDERFLOOR CARGO MANAGEMENT SYSTEM

(71) Applicant: Ford Global Technologies, LLC, Dearborn, MI (US)

(72) Inventors: John Galin, Mill Valley, CA (US); Kevin Mozurkewich, Milford, MI (US); Spencer Chamberlain, Oxford, MI (US); Bradford Zercoe, San Jose, CA (US); Jerry Wei Hua Yao, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 359 days.

(21) Appl. No.: 18/395,969

(22) Filed: Dec. 26, 2023

(65) Prior Publication Data

US 2025/0206232 A1     Jun. 26, 2025

(51) Int. Cl.
B60R 7/04           (2006.01)

(52) U.S. Cl.
CPC ...................................... B60R 7/04 (2013.01)

(58) Field of Classification Search
USPC ........................................................ 224/549
See application file for complete search history.

(56) References Cited

U.S. PATENT DOCUMENTS

| 5,526,972 A | * | 6/1996 | Frazier ...................... B60R 9/00 |
| | | | 220/531 |
| 6,247,741 B1 | * | 6/2001 | Seel .......................... B60R 7/02 |
| | | | 296/37.16 |

| 7,059,646 B1 | | 6/2006 | DeLong et al. |
| 7,201,421 B2 | * | 4/2007 | Reynolds .................. B60R 7/02 |
| | | | 296/37.16 |
| 7,350,681 B2 | | 4/2008 | Polburn et al. |
| 8,360,494 B2 | | 1/2013 | Quiros Perez |
| 10,471,881 B2 | * | 11/2019 | Bhirud .................. B60R 13/013 |
| 10,710,509 B2 | | 7/2020 | Rowland et al. |
| 2002/0000456 A1 | * | 1/2002 | Zimmermann ........... B60R 5/04 |
| | | | 224/549 |
| 2007/0207000 A1 | | 9/2007 | Bohlke et al. |

FOREIGN PATENT DOCUMENTS

| DE | 10300130 A1 | * | 7/2004 | ............... B60R 7/02 |
| DE | 102012019285 A1 | * | 3/2013 | ............... B60R 7/02 |
| DE | 102012022772 A1 | * | 5/2013 | ............... B60R 7/02 |
| DE | 102023104272 B3 | * | 4/2024 | ............... B60R 5/00 |

* cited by examiner

*Primary Examiner* — Aaron L Lembo

(74) *Attorney, Agent, or Firm* — Vichit Chea; Price Heneveld LLP

(57)          ABSTRACT

A cargo management system for a motor vehicle, the cargo management system containing a storage compartment located in a floor of the motor vehicle, a first panel configured to stow flush on the vehicle floor to cover the storage compartment in a stowed position and to pivot upward to a vertical position to form a first divider in a deployed position, a second panel configured to pivot relative to the first panel to form a second divider in the deployed position, and at least one foldable basket that stows in a folded basket configuration within the storage compartment in the vehicle floor in the stowed position and deploys upward to an unfolded basket configuration.

18 Claims, 13 Drawing Sheets

VEHICLE UNDERFLOOR CARGO MANAGEMENT SYSTEM

FIELD OF THE DISCLOSURE

The present disclosure generally relates to cargo management systems, and more particularly relates to a floor mounted cargo management system for a vehicle.

BACKGROUND OF THE DISCLOSURE

Motor vehicles are commonly employed to transport cargo onboard the vehicle. For example, motor vehicles are often used to transport cargo such as food, merchandise and groceries in bags, drink containers, and other cargo items. Motor vehicles typically include various types of storage compartments, storage trays, cup holders, and other structures for holding one or more cargo items. It would be desirable to provide for a vehicle cargo organizer that is compact and versatile.

SUMMARY OF THE DISCLOSURE

According to a first aspect of the present disclosure, a cargo management system for a motor vehicle, the cargo management system containing a storage compartment located in a floor of the motor vehicle, a first panel configured to stow flush on the vehicle floor to cover the storage compartment in a stowed position and to pivot upward to a vertical position to form a first divider in a deployed position, a second panel configured to pivot relative to the first panel to form a second divider in the deployed position, and at least one foldable basket that stows in a folded basket configuration within the storage compartment in the vehicle floor in the stowed position and deploys upward to an unfolded basket configuration.

Embodiments of the first aspect of the present disclosure can include any one or a combination of the following features:

- a third panel configured to pivot relative to the first panel to form a third divider in the deployed position;
- a hinge coupling the first panel to the second and third panels, wherein the hinge is oriented substantially vertical in the deployed position;
- a second panel configured to move to a position orthogonal to the first panel, and a third panel configured to move to a position orthogonal to the first panel;
- a second panel and third panel each configured to rotate into a position parallel with the first panel;
- at least one foldable basket comprising a first basket having foldable walls that unfold to the unfolded basket configuration;
- a first basket positioned in a first region defined by the first panel and second panel;
- at least one foldable basket further comprising a second basket;
- a second panel positioned in a second region defined by the first panel and the third panel;
- first and second foldable baskets configured to be folded and stowed within the storage compartment underneath the vehicle floor; and
- a first panel further having a handle and a latch mechanism for latching the first panel in the stowed position.

According to a second aspect of the present disclosure, a cargo management system for a motor vehicle, the cargo management system containing a storage compartment located in a floor of the motor vehicle, a first panel configured to stow flush on the vehicle floor to cover the storage compartment in a stowed position and to pivot upward to a vertical position to form a first divider in a deployed position, a second panel configured to pivot relative to the first panel to form a second divider in the deployed position, a third panel configured to pivot relative to the first panel to form a third divider in the deployed position, wherein the first panel and second panel define a first divided region, and the first panel and third panel define a second divided region, and at least one foldable basket that stows within the storage compartment in the vehicle floor in the stowed position and deploys upward to an unfolded basket position.

Embodiments of the second aspect of the present disclosure can include any one or a combination of the following features:

- a hinge coupling the first panel to the second and third panels, wherein the hinge is oriented substantially vertical in the deployed position;
- a second panel configured to move to a position orthogonal to the first panel, and a third panel configured to move to a position orthogonal to the first panel;
- a second panel and third panel each configured to rotate into a position parallel with the first panel;
- at least one foldable basket comprising a first basket having foldable walls that unfold to the unfolded basket configuration;
- a first basket positioned in the first divided region defined by the first panel and second panel;
- a second panel positioned in a second region defined by the first panel and the third panel;
- first and second baskets configured to be folded and stowed within the storage compartment underneath the vehicle floor; and
- a first panel further having a handle and a latch mechanism for latching the first panel in the stowed position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figures 1, 1A:
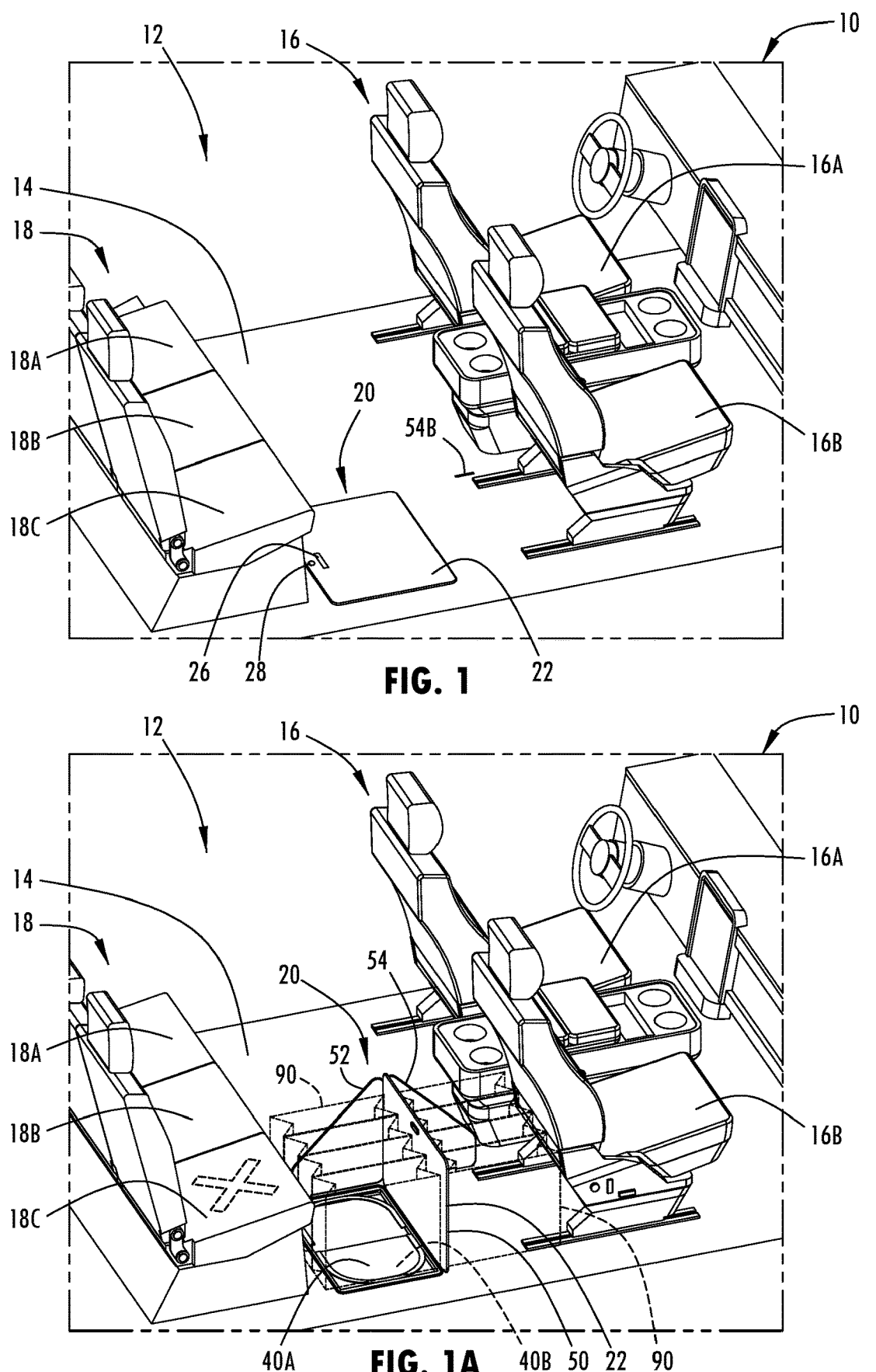
FIG. 1 is a side perspective view of the cabin interior of a motor vehicle having a cargo management system illustrated in a stowed position flush mounted on a floor, according to one example.
FIG. 1A is a side perspective view of the cabin interior of a motor vehicle illustrating the cargo management system in a first deployed position.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a cargo management system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1B:
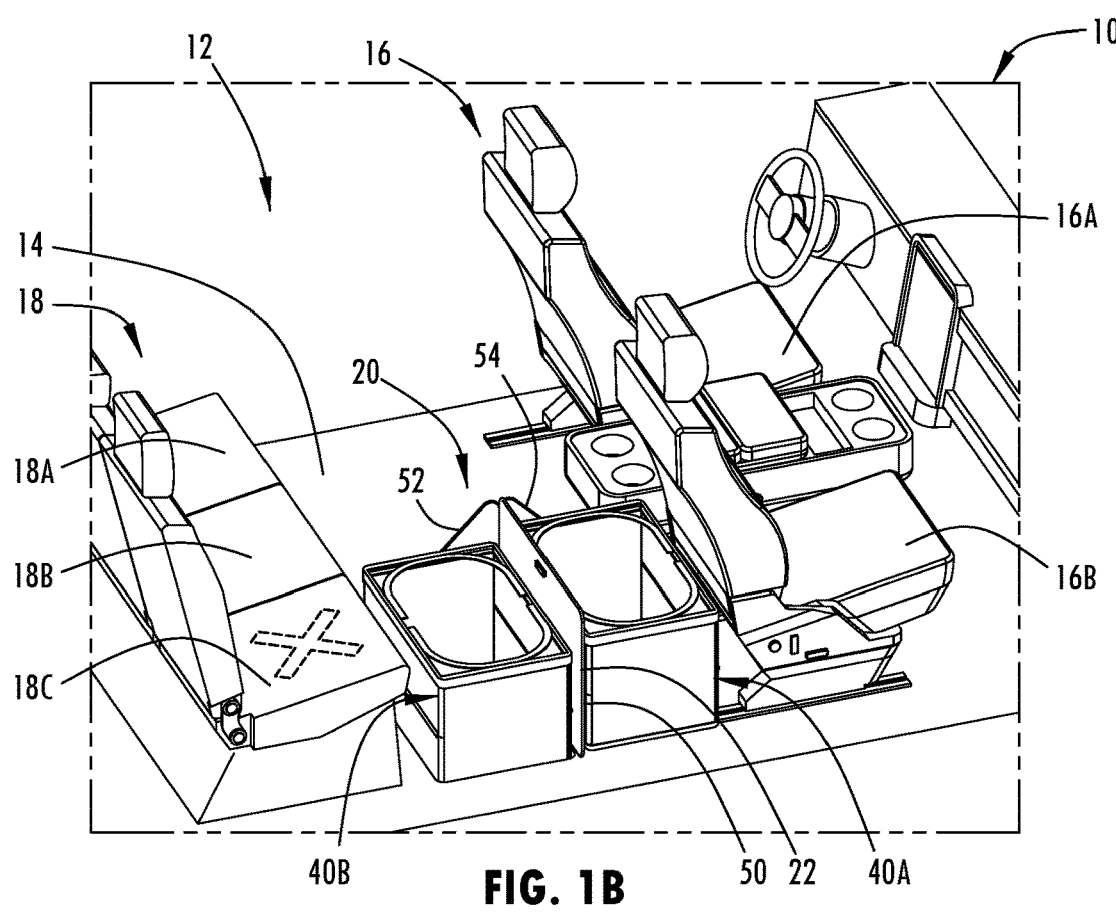
FIG. 1B is a side perspective view of the cabin interior of a motor vehicle illustrating the cargo management system in a further deployed position.

Referring to FIGS. 1-1B, an automotive or motor vehicle 10 is generally illustrated in the form of a passenger vehicle having a cargo management system 20, according to one embodiment. The motor vehicle 10 has a cabin interior 12 which is typically defined by a body having access doors and a plurality of wheel and tire assemblies that connect to axles on the motor vehicle 10. The cabin interior 12 generally defines a passenger compartment that includes a plurality of seat assemblies including a driver's seat 16A and a front passenger seat 16B provided in a front row of seating 16, and a rear row of seating 18 including rear seating assemblies 18A, 18B, and 18C. It should be appreciated that the motor vehicle 10 may include more or less seating and various other accommodations and accessories, according to various embodiments.

The motor vehicle 10 is configured to accommodate and transport a driver and one or more passengers as occupants in the cabin interior 12 of the motor vehicle 10. The motor vehicle 10 is also configured with cargo space and the cargo management system 20 to transport cargo including one or more cargo items. The cargo may be transported in the cabin interior 12 as well as in other locations of the motor vehicle 10.

The motor vehicle 10 is shown having a floor 14 generally extending on the bottom of the cabin interior 12. The floor 14 may provide an underlying support for the first and second rows of seating 16 and 18 and a footing area for passengers and cargo space. The floor 14 may be made of metal with a carpet overlay and/or a plastic or rubber floor mat overlay. Assembled into the floor 14 is the cargo management system 20 which is shown generally in FIG. 1 mounted flush with the top surface of the floor 14 with the cargo management system 20 in a stowed position. The cargo management system 20 may be deployed from the flush mounted stowed position in the floor 14 to a deployed use position as seen in FIG. 1A or a further deployed use position as seen in FIG. 1B which extends above the floor 14 to accommodate and support the holding and transportation of one or more cargo items in the motor vehicle 10. It should be appreciated that the cargo management system 20 cannot be deployed to a use position in the footwell of an occupied seat such as in the footwell immediately forward of the rear seating assembly 18C in the rear row of seating 18 shown with an "X" on the seat in FIGS. 1A and 1B indicating the seat is not available.

Figure 2:
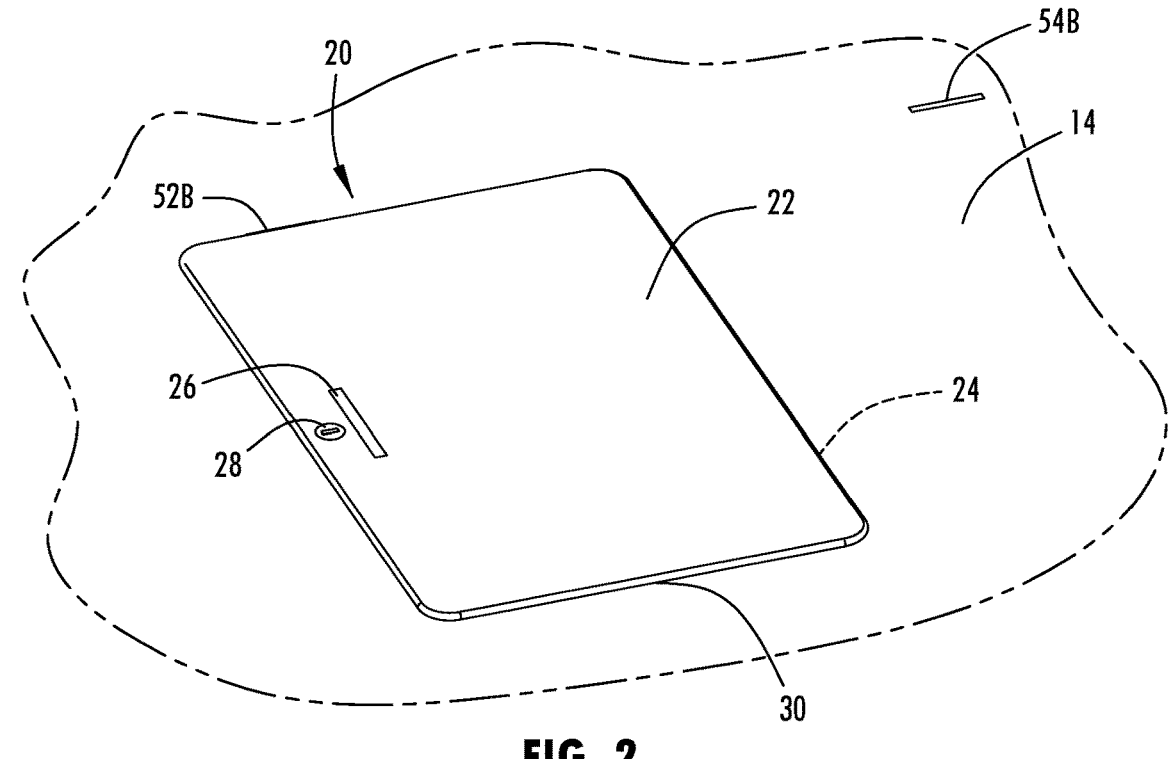
FIG. 2 is an enlarged upper perspective view of the cargo management system shown in the stowed position.
Figure 12:
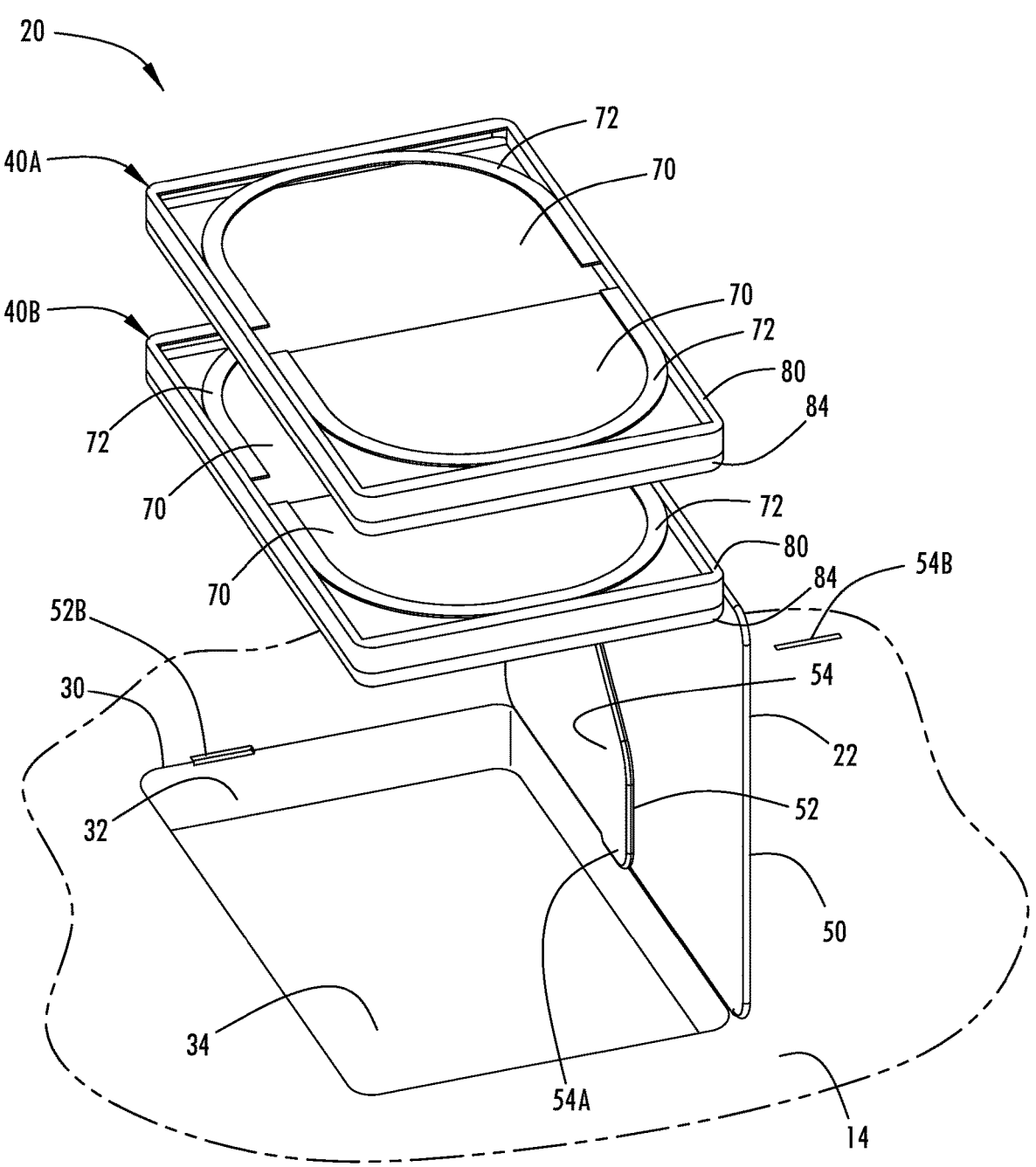
FIG. 12 is an upper perspective view of the cargo management system in a partially stowed position showing the first and second baskets in stowed configurations exploded from the storage compartment.

The cargo management system 20 has a first panel 50 which serves as a lid in the horizontal stowed position and further serves as a first divider in the vertical deployed positions. The first panel 50 is shown in FIG. 2 having a top surface 22 flush mounted with the top surface of the floor 14 and covering an opening 30 that accesses a recessed storage compartment 34 under the floor 14 as seen in FIG. 12. The first panel 50 is generally rectangular with rounded corners for covering the generally rectangular opening 30. The opening 30 defines the open top end of the recessed compartment 34 formed into and extending underneath the floor 14. The first panel 50 has a horizontal hinge 24 assembled along one edge that allows the first panel 50 to pivot at least about ninety degrees (90°) between the stowed and deployed positions shown in FIGS. 3-5. A handle 26, such as a recessed handle, is provided proximate an edge of the first panel 50 opposite the hinge 24 to allow a user to grasp the first panel 50 to move the first panel 50 to rotate between the stowed and deployed positions. In addition, a spring latch lock 28 is provided in the first panel 50 to latch the first panel 50 in the stowed position and to unlatch the first panel 50 to allow the first panel 50 to pivot between the stowed and deployed positions. The spring latch lock 28 may include a lock mechanism such as a keyed lock to secure the first panel 50 of the cargo management system 20 in the stowed position.

Figure 3:
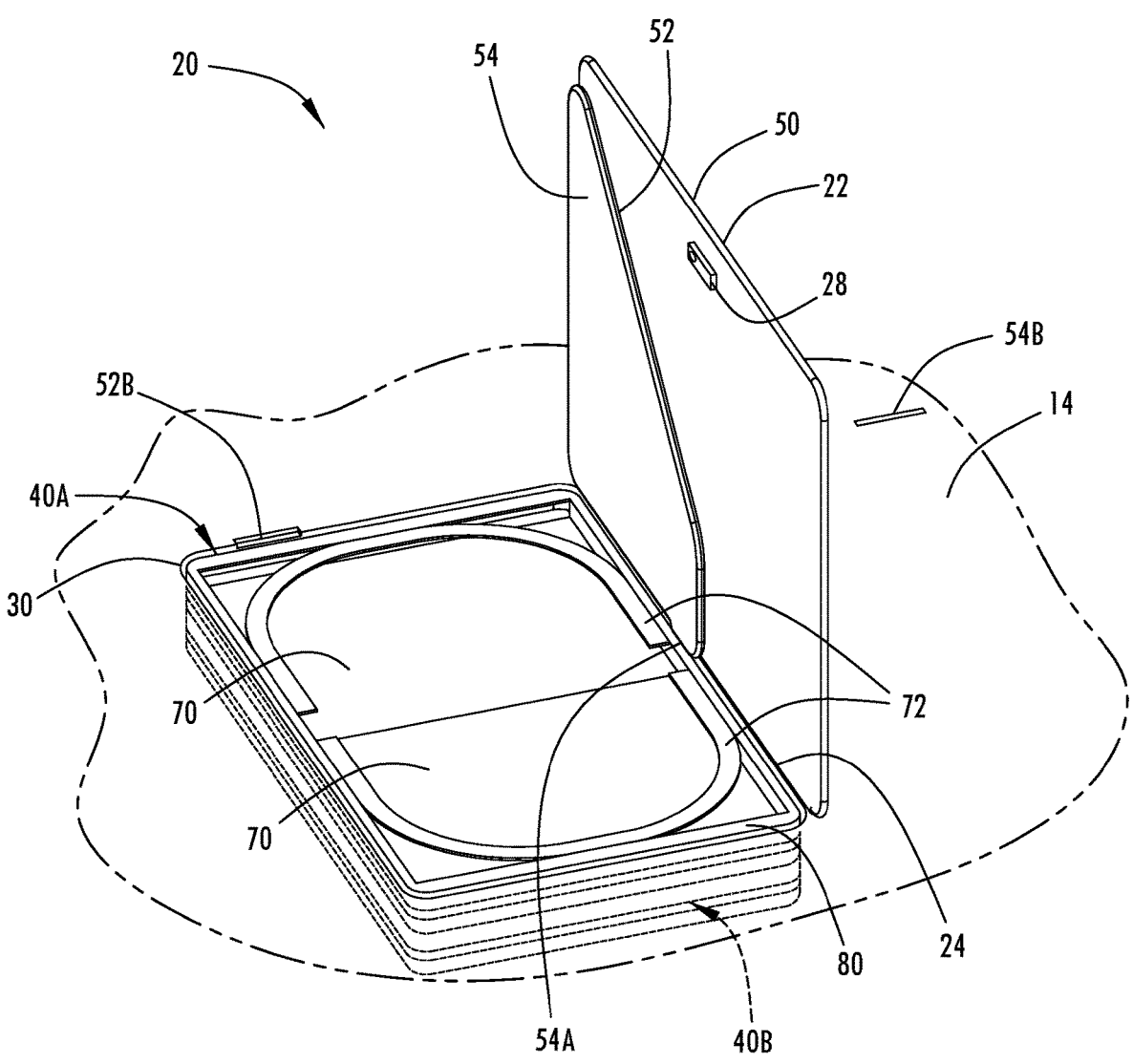
FIG. 3 is an upper perspective view of the cargo management system shown in a partially deployed position.
Figure 4:
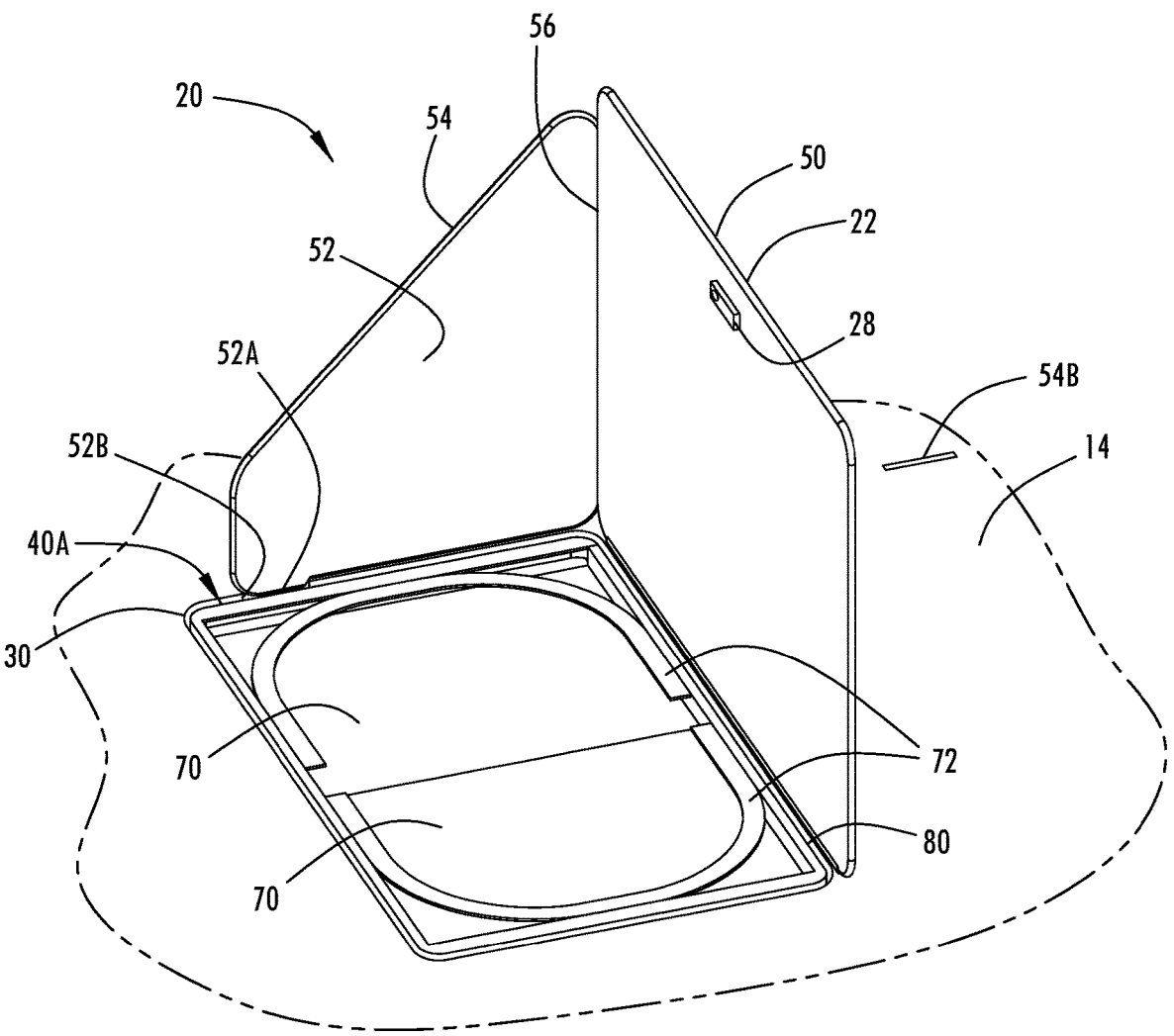
FIG. 4 is an upper perspective view of the cargo management system shown in a further deployed position.
Figure 5:
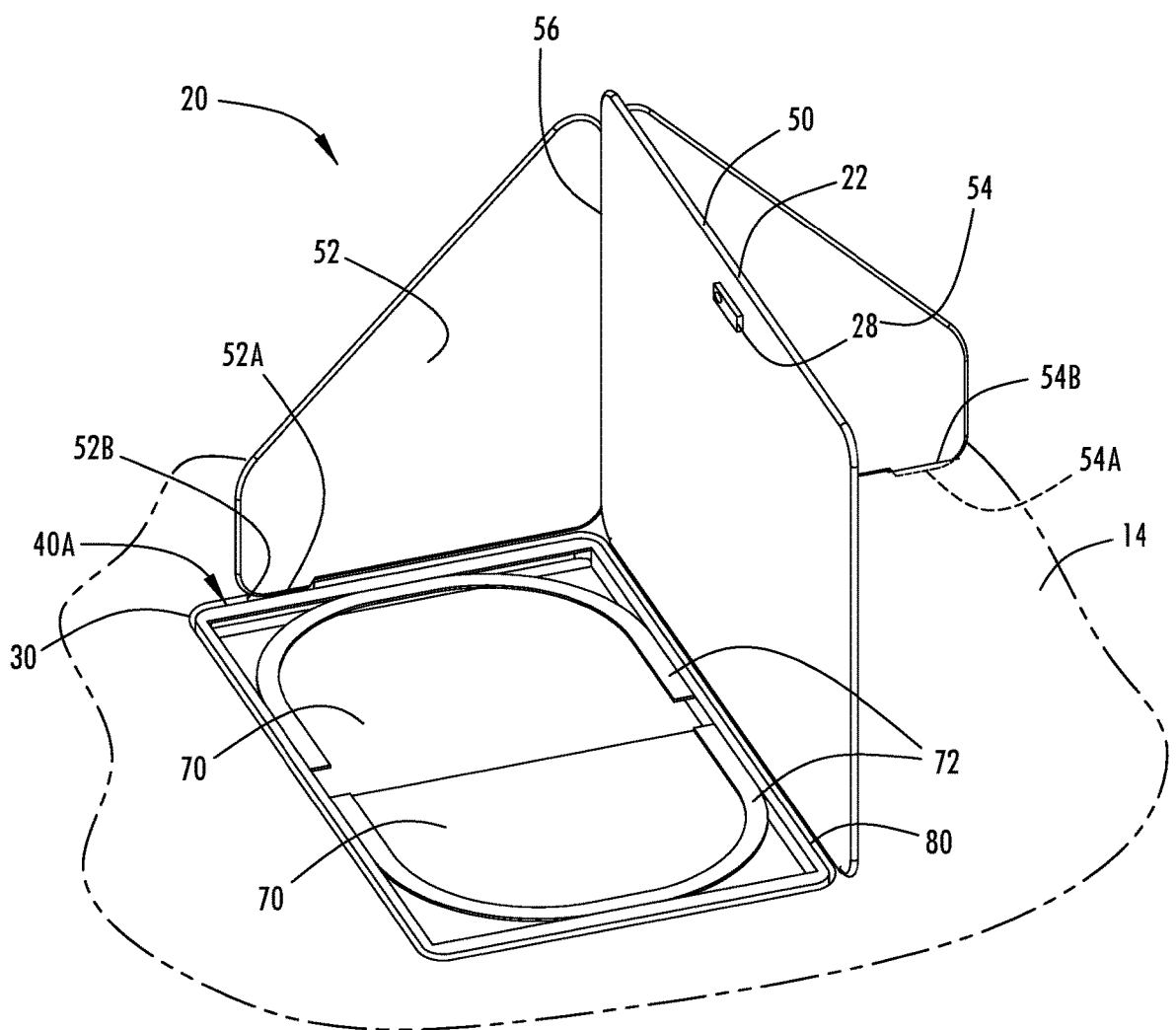
FIG. 5 is an upper perspective view of the cargo management system shown in a further deployed position.

The cargo management system 20 further includes a second panel 52 and a third panel 54 rotatably coupled by a three-way hinge 56 connected to the first panel 50. The second and third panels 52 and 54 may stow in a position parallel to the first panel 50 underneath the first panel 50 in the stowed position. With the first panel 50 in the vertical deployed position forming the first divider as seen in FIG. 3, the second panel 52 as seen in FIG. 4 may be rotated with the third panel 54 relative to the first panel 50 about the three-way hinge 56 approximately ninety degrees (90°) to a deployed divider position. In addition, the third panel 54, which is folded against the second panel 52 in FIG. 4, may be rotated relative to the first panel 50 by approximately two-hundred seventy degrees (270°) about the three-way hinge 56 to a deployed divider position one hundred eighty degrees (180°) from the second panel 52 as seen in FIG. 5.

Figure 6:
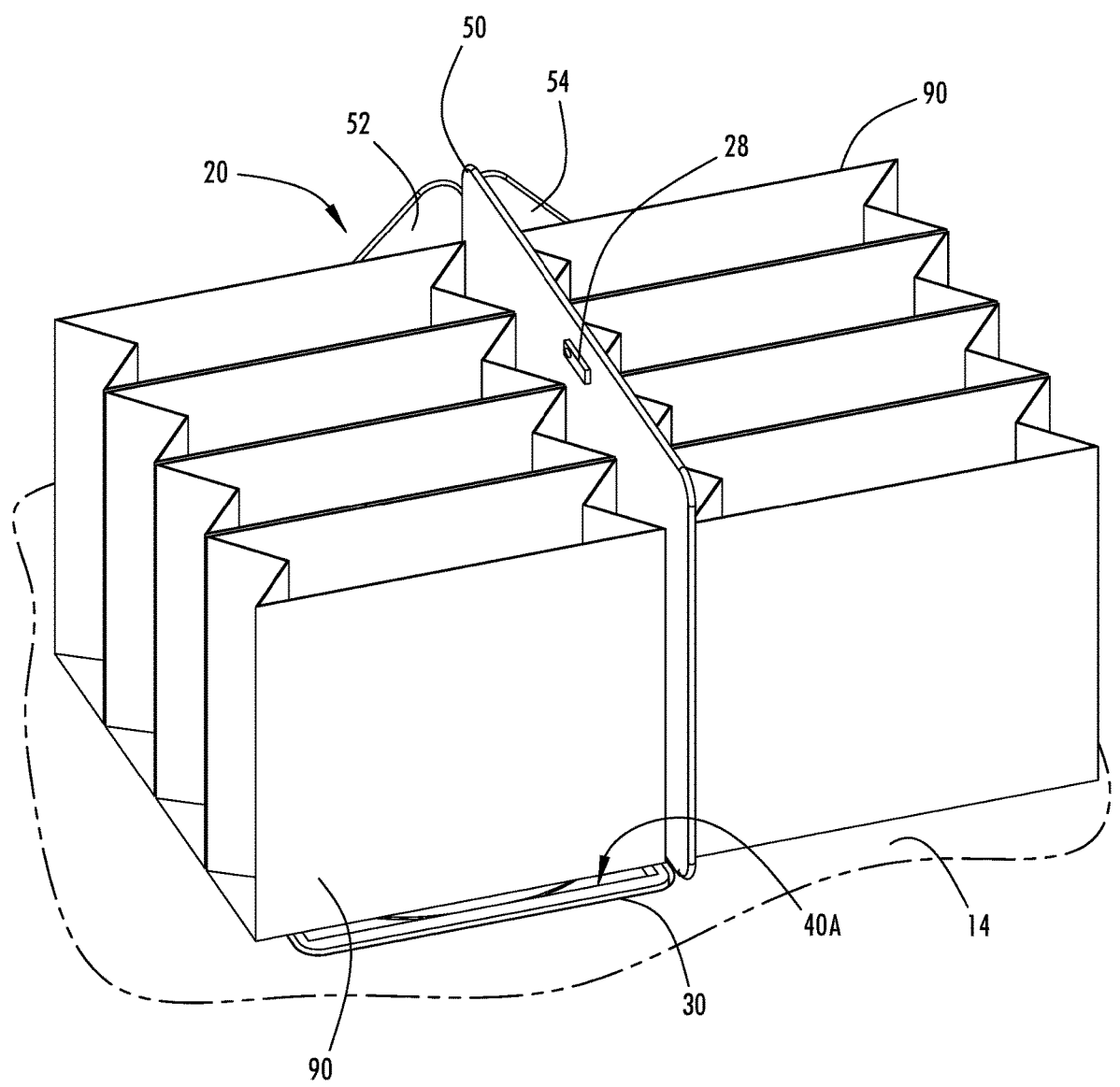
FIG. 6 is an upper perspective view of the cargo management system shown supporting cargo in the form of a plurality of grocery bags, according to one example.

As such, the second panel is orthogonal to the first panel, and the third panel is orthogonal to the first panel. In this position, the first panel 50, second panel 52, and third panel 54 divide the cargo storage area of the cabin interior into divided regions that may stabilize and support cargo items transported within the motor vehicle 10. The second panel 52 has a triangular upper portion and a foot 52A on the lower outward end configured to matingly engage a slot 52B in the floor 14 to hold the second panel 52 in the deployed position. The third panel 54 likewise has a triangular upper portion and a foot 54A on the lower outward end configured to matingly engage a slot 54B in the floor 14 to hold the third panel 54 in the deployed position. The divided regions include a first divider region defined on two sides by the first panel 50 and the second panel 52, and a second divider region defined on two sides by the first panel 50 and the third panel 54. As seen in FIG. 6, cargo in the form of a plurality of storage bags 90 such as grocery bags, for example, may be placed within each of the divided regions to allow for more secure transportation of the cargo.

Figure 7:
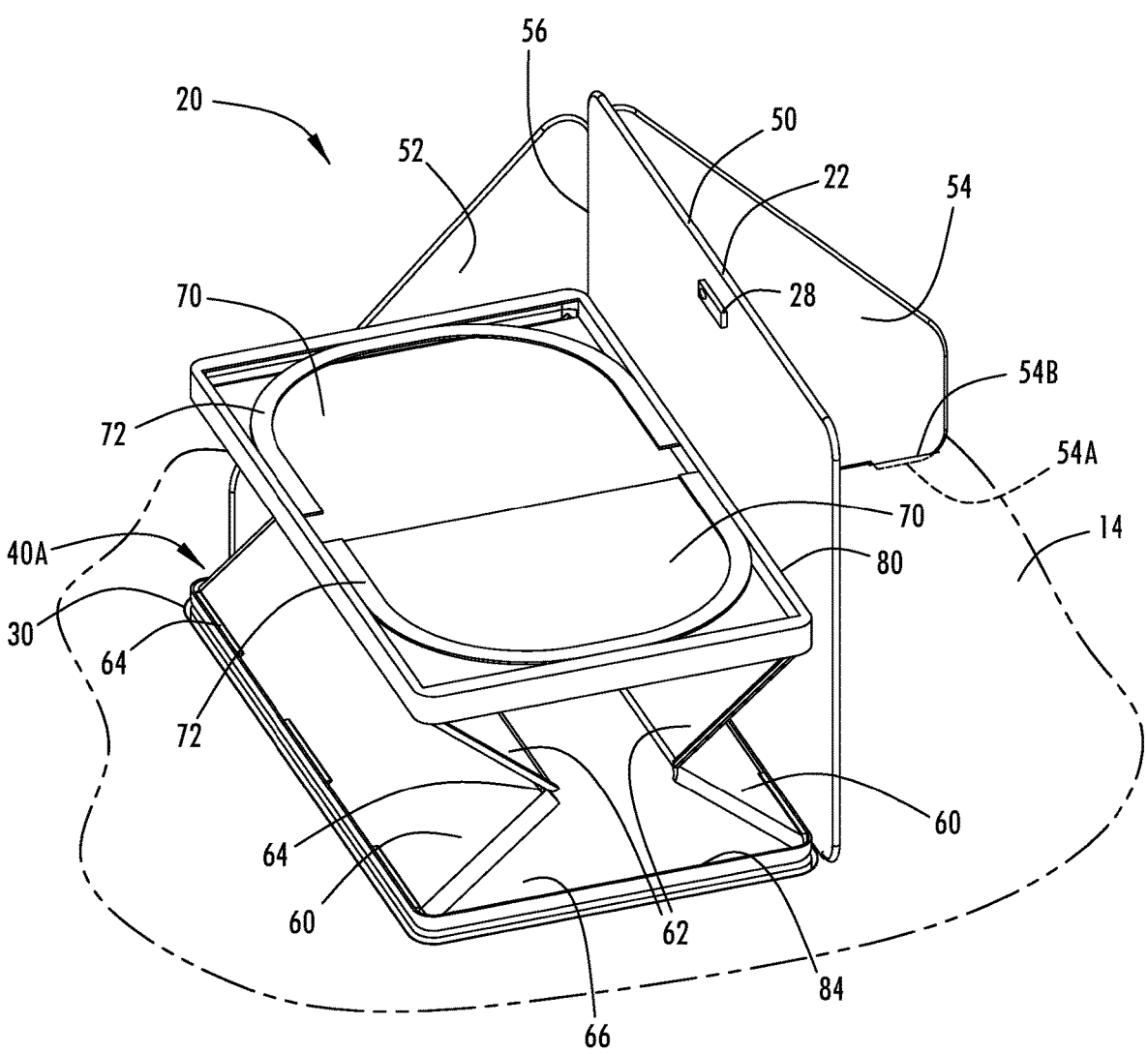
FIG. 7 is an upper perspective view of the cargo management system showing deployment of a partially deployed first basket.
Figure 8:
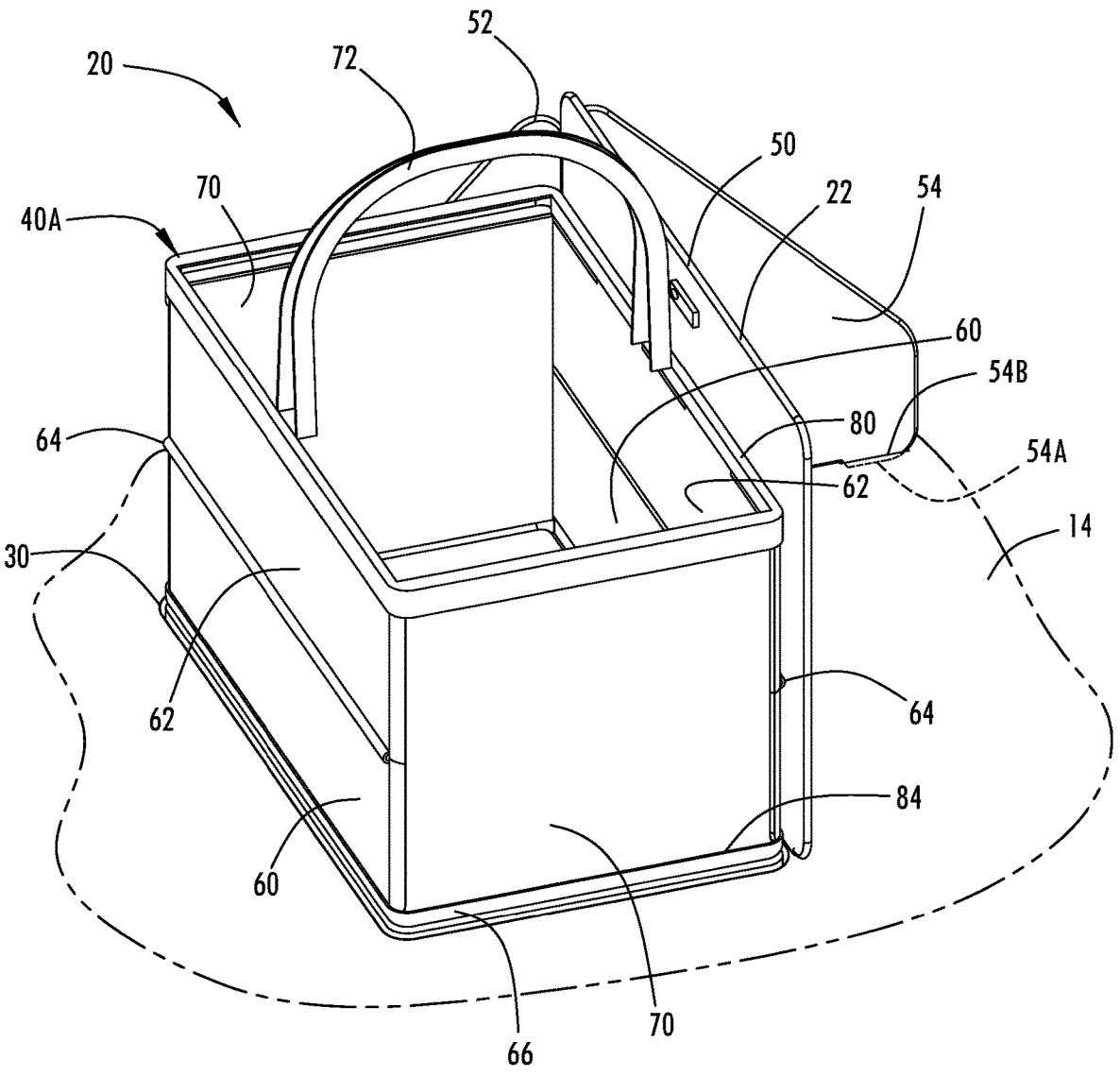
FIG. 8 is an upper perspective view of the cargo management system showing the first basket in a fully deployed position.

The cargo management system 20 may further be deployed to further deployed positions as seen in FIGS. 7-11. Contained within the underneath cargo compartment 34 and below the first panel 50 in the stowed position is at least one deployable basket, including a deployable first basket 40A. With the first panel 50, second panel 52, and third panel 54 fully deployed as vertical dividers, the first basket 40A may be deployed as shown in FIG. 7 from the stowed folded position or otherwise compacted position to an unfolded use position shown in FIG. 8 by pulling upward on the upper end of the first deployable basket 54 such as via a pair of handles 72. The first basket 40A generally includes foldable lower and upper walls 60 and 62 on opposite lateral sides and end walls 70 on opposite ends. The foldable lower and upper walls 60 and 62 are operatively covered to a horizontal oriented hinge 64 which allows the lower and upper walls 60 and 62 to fold to the folded position seen in FIG. 12 and extend to the deployed position as seen in FIG. 8. The end walls 70 may be folded onto the top end of the first basket 40A in the folded position and may rotate about a horizontal hinge 71 to extend downward to a vertical position when the lower and upper side wall 60 and 62 are fully extended in the deployed position. As seen in FIG. 8, the deployable first basket 40A includes four walls generally configured in a rectangular shape to form a compartment made available to store one or more cargo items.

Figure 9:
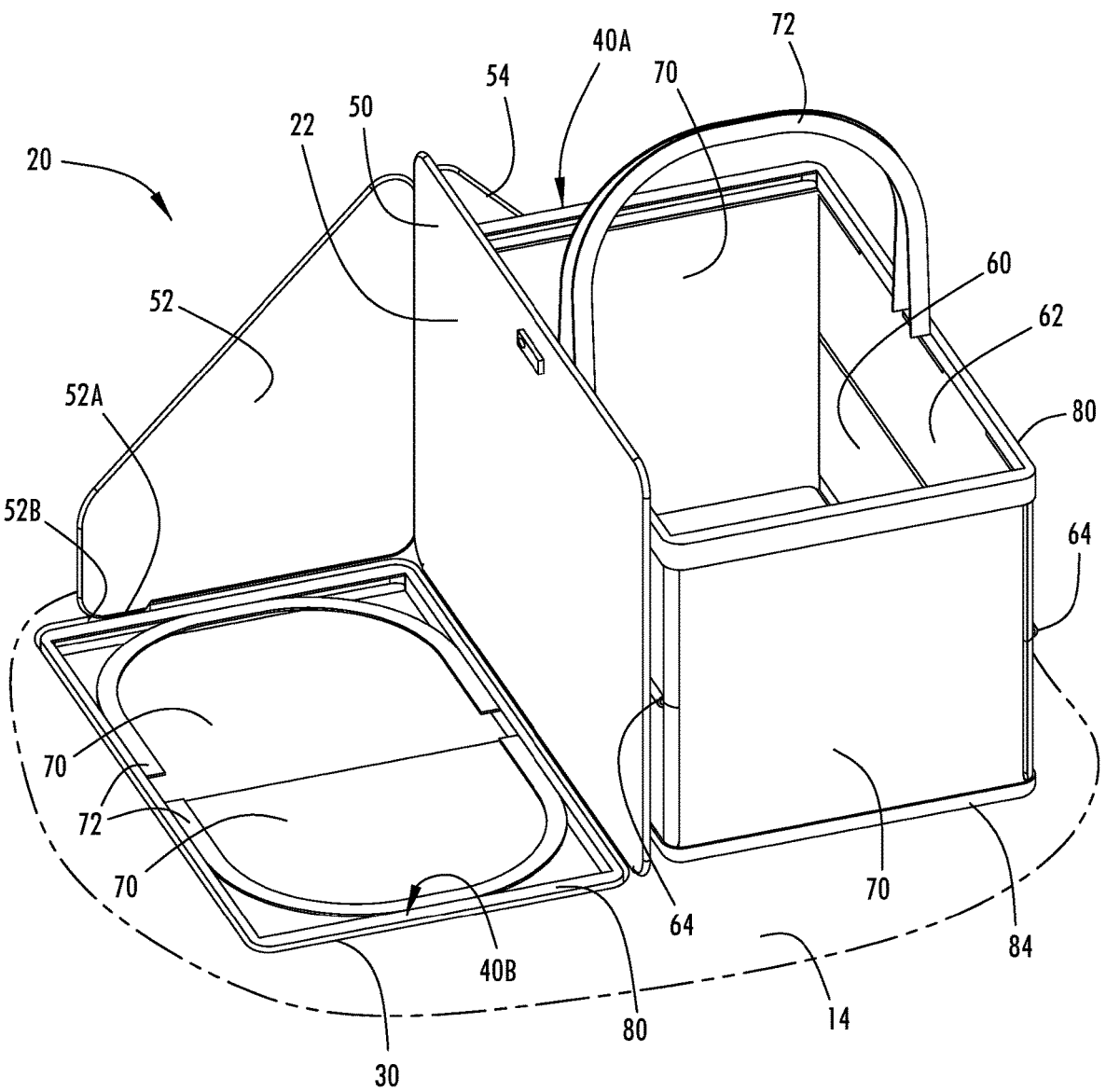
FIG. 9 is an upper perspective view of the cargo management system showing the first basket relative to a second basket.
Figure 10:
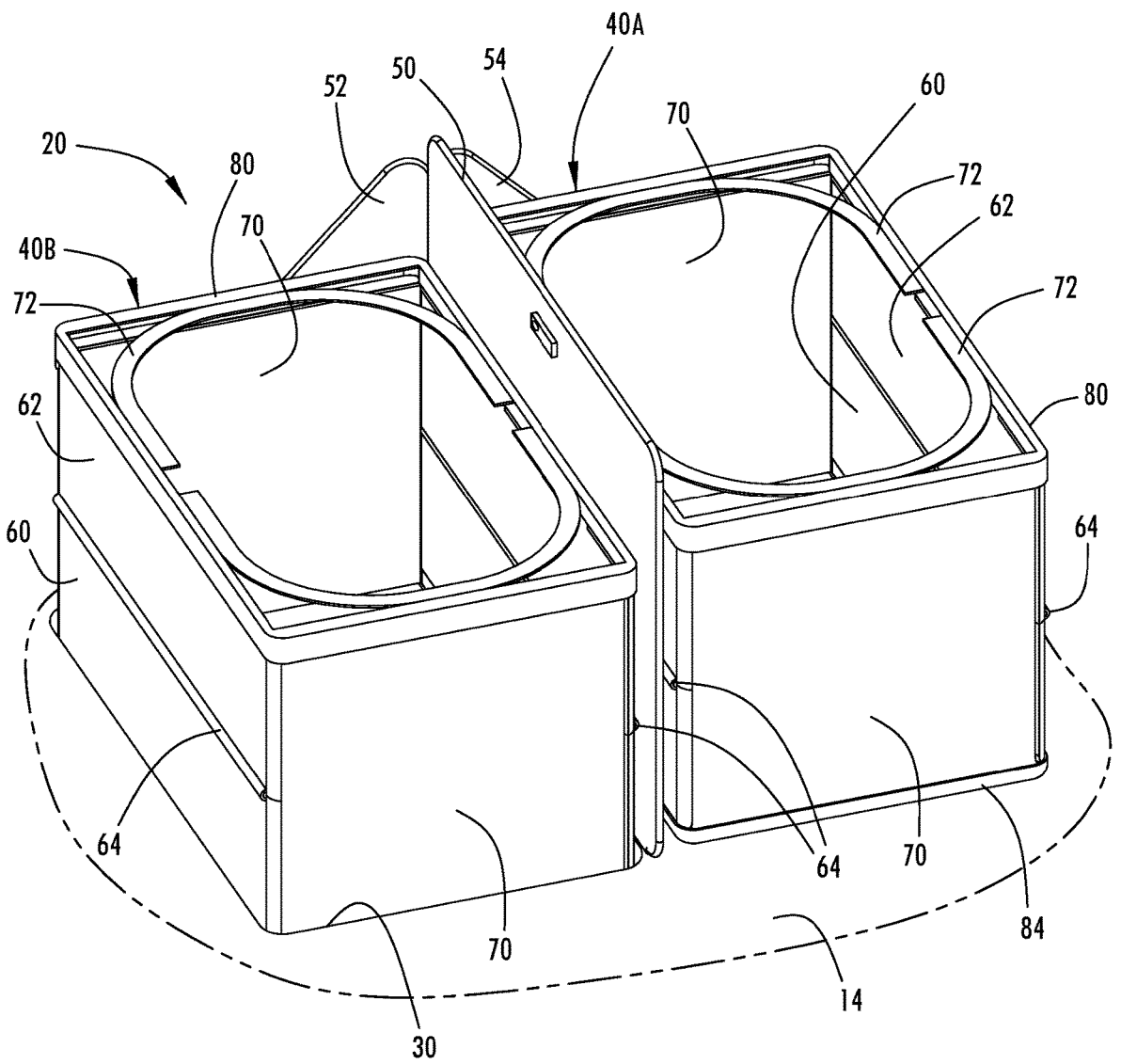
FIG. 10 is an upper perspective view of the cargo management system showing the first and second baskets in a deployed position.
Figure 11:
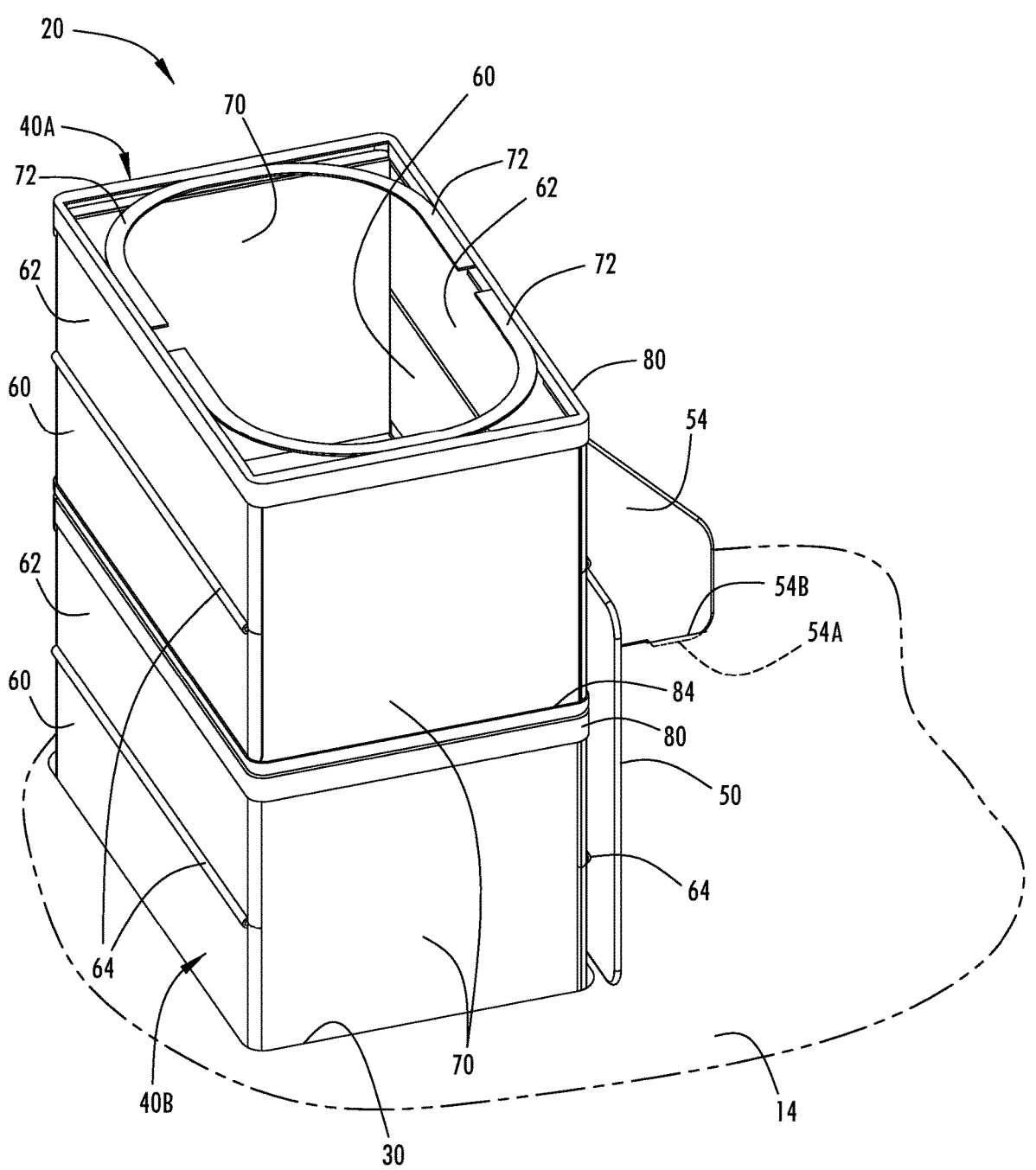
FIG. 11 is an upper perspective view of the cargo management system showing the first and second baskets in a stacked position.

The first basket 40A, which is shown in FIG. 8 fully deployed in the unfolded configuration, may be moved to another divider region bounded by the first panel 50 and the third panel 54 as seen in FIG. 9. Below the first basket 40A in the folded stowed position is a deployable second basket 40B which may likewise to deployed from the folded stowed position seen in FIG. 9 to the unfolded deployed position as seen in FIG. 10. The deployable second basket 40B likewise includes lower and upper walls 60 and 62 on opposite lateral sides connected via a horizontal hinge 64 and end walls 70 that rotate about horizontal hinge 71 between stowed and deployed positions similar to the configuration of the first deployable basket 40A. In the fully deployed position, the first and second baskets 40A and 40B are made available to store one or more cargo items within any of the divider regions as seen in FIG. 10 or may be stacked one on top of the other as shown in FIG. 11 or other regions in the motor vehicle 10.

Referring to FIG. 12, the deployable first and second baskets 40A and 40B are shown in the compact folded arrangement and exploded and removed from the storage compartment 34 formed in the floor 14 with the first panel 50 oriented vertically in the open lid or divider position. It should be appreciated that the first and second baskets 40A and 40B may be folded up to the compact folded arrangement and re-stowed within the storage compartment 34 and the first panel 50 defining the lid rotated to the closed position when the cargo management system 20 is no longer deployed for use to hold cargo.

Figure 13:
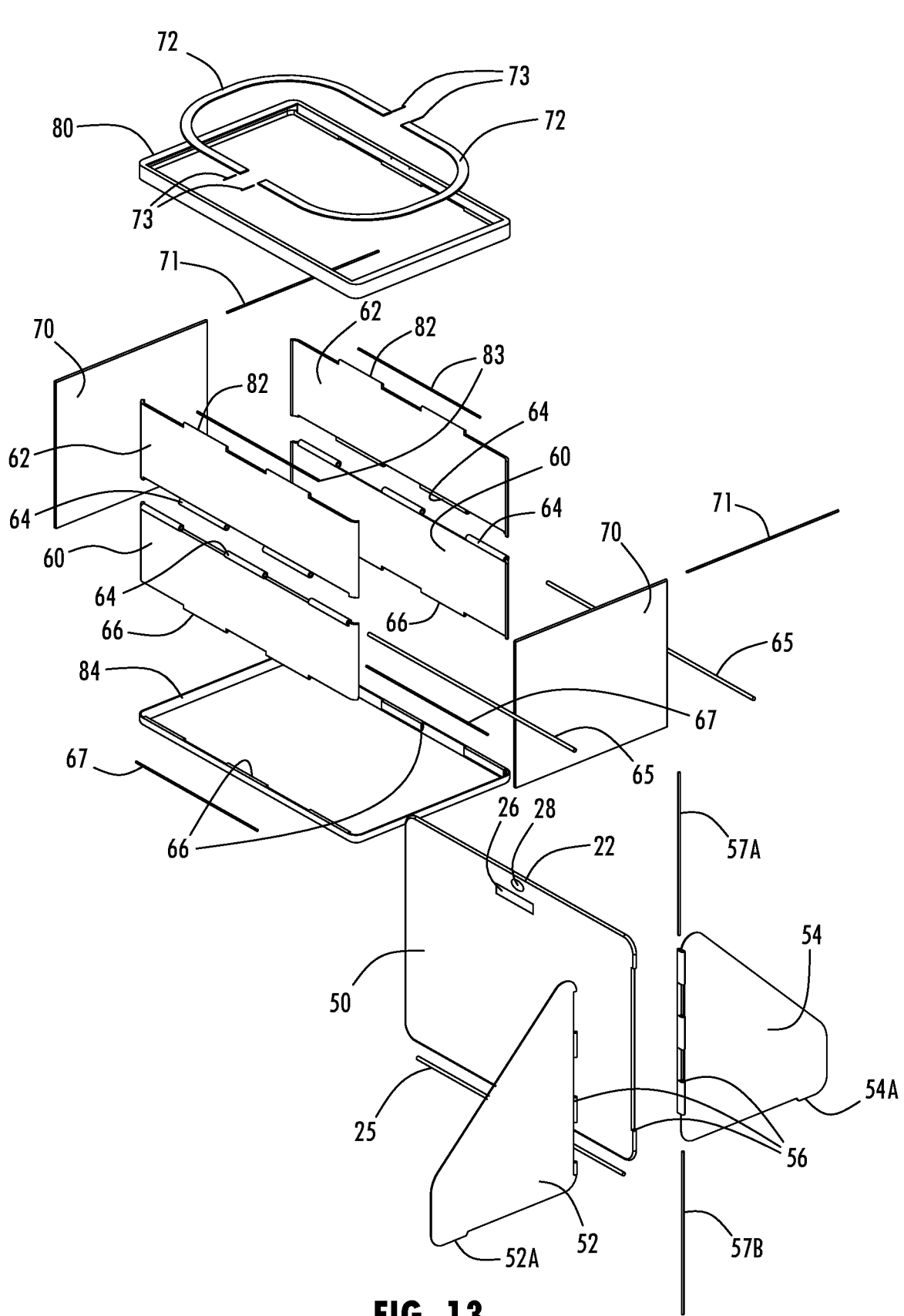
FIG. 13 is an exploded view of the cargo management system, including the dividers and the first basket.

Referring to FIG. 13, the divider regions created by the first, second, and third panels 50, 52, and 54 and the first basket 40A are further shown in the exploded view. As seen, the first, second, and third panels 50, 52, and 54 are each connected to the three-way hinge 56 that interconnects the panels 50, 52, and 54 via hinge pins 57A and 57B and advantageously allows the second and third panels 52 and 54 to pivot relative to the first panel 50 about a vertical axis defined by three-way hinge 56. First panel 50 connects to the horizontal hinge 24 via hinge pin 25 on the bottom edge.

The first basket 40A has a horizontal hinge 64 connecting the lower wall 60 to the upper wall 62 on each opposite side and includes a horizontal hinge pin 65. Further, the end walls 70 each include a horizontal hinge pin 71 at the upper end that allows the end wall 70 to pivot between the upper horizontal position and the downward deployed position. Additionally, the lower edge of lower walls 60 are hingedly connected to a base 84 via horizontal hinge 66 and hinge pins 67. The upper edge of upper walls 62 are hingedly connected to a top frame 80 via horizontal hinges 82 and hinge pins 83. The pair of handles further are rotatably connected to the top frame 80 via pivot connectors 73 on opposite ends. As such, the first basket 40A may be folded into a compact low-profile arrangement when not used to store cargo. It should be appreciated that the second basket 40B may be configured the same or similar to the first basket 40A.

Accordingly, the cargo management system 20 advantageously provides for enhanced management of cargo within the cabin interior 12 of the motor vehicle 10. The cargo management system 20 is compact and versatile and may be flush mounted stowed in the floor 14 or deployed to provide divided regions with dividers and may further provide for storage within one or more deployable baskets to advantageously assist with the transportation of cargo in the motor vehicle 10.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A cargo management system for a motor vehicle, the cargo management system comprising:

a storage compartment located in a floor of the motor vehicle;

a first panel configured to stow flush on the vehicle floor to cover the storage compartment in a stowed position and to pivot upward to a vertical position to form a first divider in a deployed position;

a second panel configured to pivot relative to the first panel to form a second divider in the deployed position;

a third panel configured to pivot relative to the first panel to form a third divider in the deployed position;

a hinge coupling the first panel to the second and third panels, wherein the hinge is oriented substantially vertical in the deployed position; and at least one foldable basket that stows in a folded basket configuration within the storage compartment in the vehicle floor in the stowed position and deploys upward to an unfolded basket configuration.

2. The cargo management system for a motor vehicle of claim 1, wherein the second panel is configured to move to a position orthogonal to the first panel, and the third panel is configured to move to a position orthogonal to the first panel.

3. The cargo management system for a motor vehicle of claim 2, wherein the second panel and third panel each are configured to rotate into a position parallel with the first panel.

4. The cargo management system for a motor vehicle of claim 1, wherein the at least one foldable basket comprises a first basket having foldable walls that unfold to the unfolded basket configuration.

5. The cargo management system for a motor vehicle of claim 4, wherein the first basket is positioned in a first region defined by the first panel and second panel.

6. The cargo management system for a motor vehicle of claim 5, wherein the at least one foldable basket further comprises a second basket.

7. The cargo management system for a motor vehicle of claim 1, wherein the first panel further comprises a handle and a latch mechanism for latching the first panel in the stowed position.

8. A cargo management system for a motor vehicle, the cargo management system comprising:

a storage compartment located in a floor of the motor vehicle;

a first panel configured to stow flush on the vehicle floor to cover the storage compartment in a stowed position and to pivot upward to a vertical position to form a first divider in a deployed position;

a second panel configured to pivot relative to the first panel to form a second divider in the deployed position; and at least one foldable basket that stows in a folded basket configuration within the storage compartment in the vehicle floor in the stowed position and deploys upward to an unfolded basket configuration, wherein the at least one foldable basket comprises a first basket having foldable walls that unfold to the unfolded basket configuration, wherein the first basket is positioned in a first region defined by the first panel and second panel, wherein the second panel is positioned in a second region defined by the first panel and a third panel, and wherein the at least one foldable basket further comprises a second basket.

9. The cargo management system for a motor vehicle of claim 8, wherein the first and second baskets are configured to be folded and stowed within the storage compartment underneath the vehicle floor.

10. A cargo management system for a motor vehicle, the cargo management system comprising:

a storage compartment located in a floor of the motor vehicle;

a first panel configured to stow flush on the vehicle floor to cover the storage compartment in a stowed position and to pivot upward to a vertical position to form a first divider in a deployed position;

a second panel configured to pivot relative to the first panel to form a second divider in the deployed position;

a third panel configured to pivot relative to the first panel to form a third divider in the deployed position, wherein the first panel and second panel define a first divided region, and the first panel and third panel define a second divided region; and at least one foldable basket that stows within the storage compartment in the vehicle floor in the stowed position and deploys upward to an unfolded basket position.

11. The cargo management system for a motor vehicle of claim 10, further comprising a hinge coupling the first panel to the second and third panels, wherein the hinge is oriented substantially vertical in the deployed position.

12. The cargo management system for a motor vehicle of claim 11, wherein the second panel is configured to move to a position orthogonal to the first panel, and the third panel is configured to move to a position orthogonal to the first panel.

13. The cargo management system for a motor vehicle of claim 12, wherein the second panel and third panel each are configured to rotate into a position parallel with the first panel.

14. The cargo management system for a motor vehicle of claim 10, wherein the at least one foldable basket comprises a first basket having foldable walls that unfold to the unfolded basket configuration.

15. The cargo management system for a motor vehicle of claim 14, wherein the first basket is positioned in the first divided region defined by the first panel and second panel.

16. The cargo management system for a motor vehicle of claim 15, wherein the second panel is positioned in a second region defined by the first panel and the third panel.

17. The cargo management system for a motor vehicle of claim 16, wherein the first and second baskets are configured to be folded and stowed within the storage compartment underneath the vehicle floor.

18. The cargo management system for a motor vehicle of claim 10, wherein the first panel further comprises a handle and a latch mechanism for latching the first panel in the stowed position.

* * * * *